M. L. AKERS.
ATTACHMENT FOR GRAIN DRILLS.
APPLICATION FILED AUG. 30, 1912. RENEWED JUNE 12, 1914.

1,104,602.

Patented July 21, 1914.

WITNESSES
George Bambay.
J. L. McAuliffe

INVENTOR
Maurice L. Akers
BY
ATTORNEYS

THE NORRIS PETERS CO., PHOTO-LITHO., WASHINGTON, D. C.

UNITED STATES PATENT OFFICE.

MAURICE LEONARD AKERS, OF PENDLETON, OREGON, ASSIGNOR TO PENDLETON IRON WORKS, OF PENDLETON, OREGON.

ATTACHMENT FOR GRAIN-DRILLS.

1,104,602. Specification of Letters Patent. Patented July 21, 1914.

Application filed August 30, 1912, Serial No. 717,890. Renewed June 12, 1914. Serial No. 844,811.

*To all whom it may concern:*

Be it known that I, MAURICE L. AKERS, a citizen of the United States, and a resident of Pendleton, in the county of Umatilla and State of Oregon, have invented a new and Improved Attachment for Grain-Drills, of which the following is a full, clear, and exact description.

My invention relates to attachments to be applied to grain drill boots or hoes, and it is a design of my invention to produce a device of the indicated character which can be readily applied to the hoe of ordinary drills, and which will serve to effectively sustain the weight of the hoe and permit of the ready adjustment of the shoe to regulate the depth of seeding the grain.

It is a further design of my invention to provide a shoe that will effectively press the soil around the grain, and pulverize the clods that may roll into the furrow made by the hoe, thereby providing a perfect seed bed and insuring a proper covering of the seed.

The invention will be particularly explained in the specific description hereinafter to be given.

Reference is to be had to the accompanying drawings forming a part of this specification, in which similar characters of reference indicate corresponding parts in all the views.

Figure 1:
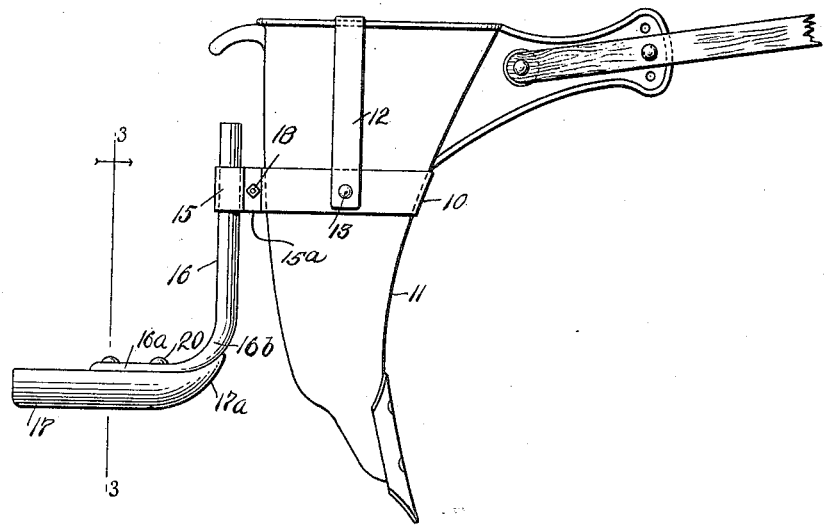
Figure 2:
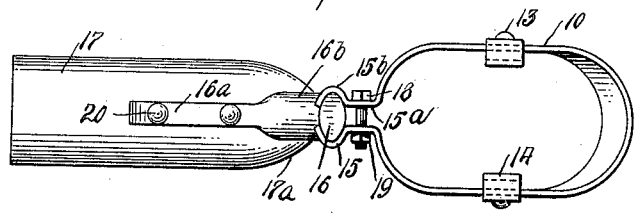
Figure 3:
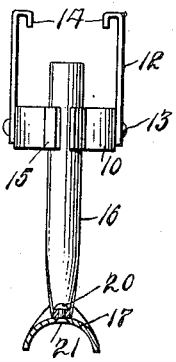

Figure 1 is a side elevation showing my attachment applied to a hoe; Fig. 2 is a plan view of the attachment without the hoe; and Fig. 3 is a rear view of the attachment, parts being in section on the line 3—3 of Fig. 1.

In forming the attachment, a band or collar 10 is provided to embrace the seed-dropping hoe or boot 11, and is given a shape to conform approximately to the exterior conformation of the hoe. The side arms of the collar 10 carry at opposite sides the strap hangers 12, which are riveted to the collars 13, or otherwise properly secured thereto, and at their upper ends said straps are inturned toward each other and then returnbent, as at 14, to hook over the upper edge of the hoe or boot 11. The arms of the collar 10 at the rear, curve toward each other and are then extended rearwardly to form clamp jaws 15 which receive the shank 16 of the shoe 17. The jaws 15 adjacent to the side arms of the collar 10 are preferably bent parallel with each other, as at 15ª, the rearward ends of the jaws being then given outward bends as at 15ᵇ, the said bent portions conforming to the particular cross section of the shank 16, which desirably is oval. A bolt 18 is employed and provided with a nut 19, the bolt passing through the parallel portions 15ª of the jaws and serving to cause said jaws to tightly grip the shank 16. Obviously by loosening the nut 19, the shank 16 may be adjusted vertically and secured in any position to sustain the shoe 17 at the proper height to regulate the depth of the furrow formed by the hoe 11. The shoe 17 is concavo-convex in form, the concave side being the lowermost, as clearly shown in Fig. 3, and said shoe is secured in the instance shown, to the foot 16ª of the shank 16, by rivets 20, the rivets being desirably countersunk, as shown at 21 in Fig. 3.

It will be observed that the shoe is elongated and extends in substantially a straight line, except at the forward end 17ª, which curves upwardly. The mentioned upwardly-curved end of the shoe conforms in the instance shown to the similarly curved bend at the junction of the shank 16 and foot 16ª, as at 16ᵇ. The upwardly curved and shaped forward end 17ª of the shoe effectively guides the soil to the shoe, and presses the soil around the grain deposited by the hoe 11. The shoe furthermore, is effective in pulverizing any clods that roll into the furrow made by the hoe, so that a perfect seed bed is formed and a proper covering of the grain is insured.

It will be seen that the attachment may be applied to the hoe or boot of the ordinary grain drill, and it will be understood that the formation of the parts may vary accordingly in practice to adapt it to the particular make of the hoe.

Having thus described my invention, I claim as new, and desire to secure by Letters Patent,—

1. An attachment for grain drills, comprising a shoe having a shank, a collar adapted to embrace the boot or hoe of a grain drill, means for clamping the collar to said shank, and hanger straps extending upwardly from the collar and having means to engage the upper edge of a grain drill boot.

2. An attachment for grain drill boots, comprising a shoe, a shank extending upwardly from the shoe, a collar adapted to embrace the hoe or boot of a grain drill, the side arms of the collar at their rear ends constituting clamp jaws embracing the shank of the shoe, a bolt on said clamp jaws, and hanger straps secured to the collar and extending upwardly therefrom, the upper ends of the hangers having inturned ends adapted to hook over the upper edge of the hoe or boot.

3. An attachment for grain drill boots, consisting of a split band including a collar to slidably embrace the boot, parallel arms extending rearwardly from the terminal ends of the collar, and jaws at the ends of the parallel arms to embrace a shoe shank.

4. An attachment for grain drill boots, consisting of a split band, and hangers rising from the band at the sides and formed with return-bends at the upper ends thereof to hook over the top edge of the boot, said split band including a collar to slidably embrace the boot, parallel arms extending rearwardly from the terminal ends of the collar, a clamp bolt extending through the said parallel arms, and jaws at the ends of the parallel arms to embrace a shoe shank.

5. An attachment for grain drill boots, comprising a collar adapted to embrace the boot, a clamp on the rear end of the collar, and a shoe having a shank adjustably held by said clamp, the shoe being substantially horizontal for its major portion, and the shoe and shank curving upwardly in close relation at the front end of the shoe, said shoe furthermore being concavo-convex in cross section throughout its length including the horizontal portion and upwardly curved front end.

In testimony whereof I have signed my name to this specification in the presence of two subscribing witnesses.

MAURICE LEONARD AKERS.

Witnesses:
FRANCES WEBER,
WILL M. PETERSON.

---

Copies of this patent may be obtained for five cents each, by addressing the "Commissioner of Patents, Washington, D. C."